United States Patent
Park et al.

(10) Patent No.: US 9,928,957 B2
(45) Date of Patent: *Mar. 27, 2018

(54) MULTILAYER CERAMIC ELECTRONIC COMPONENT AND BOARD HAVING THE SAME

(71) Applicant: SAMSUNG ELECTRO-MECHANICS CO., LTD., Suwon-si, Gyeonggi-do (KR)

(72) Inventors: Heung Kil Park, Suwon-si (KR); Sang Soo Park, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 103 days.

This patent is subject to a terminal disclaimer.

(21) Appl. No.: 15/000,360

(22) Filed: Jan. 19, 2016

(65) Prior Publication Data

US 2016/0343506 A1 Nov. 24, 2016

(30) Foreign Application Priority Data

May 27, 2015 (KR) .......... 10-2015-0074097

(51) Int. Cl.
*H01G 4/30* (2006.01)
*H01G 4/248* (2006.01)
*H01G 4/005* (2006.01)
*H01G 4/12* (2006.01)
*H01F 17/00* (2006.01)
*H01F 17/04* (2006.01)

(52) U.S. Cl.
CPC ......... *H01G 4/005* (2013.01); *H01F 17/0013* (2013.01); *H01F 17/04* (2013.01); *H01G 4/12* (2013.01); *H01G 4/248* (2013.01); *H01G 4/30* (2013.01); *H01F 2017/048* (2013.01)

(58) Field of Classification Search
None
See application file for complete search history.

(56) References Cited

U.S. PATENT DOCUMENTS

| 6,191,933 B1* | 2/2001 | Ishigaki ............... H01G 4/232 |
| | | 361/309 |
| 7,331,799 B1* | 2/2008 | Lee ........................ H01G 2/06 |
| | | 361/306.3 |
| 9,466,427 B2* | 10/2016 | Park ....................... H05K 1/111 |
| 2011/0043963 A1* | 2/2011 | Bultitude ................ H01G 2/16 |
| | | 361/321.4 |
| 2014/0055910 A1* | 2/2014 | Masuda ................... H01G 4/01 |
| | | 361/303 |
| 2015/0014040 A1* | 1/2015 | Ahn ........................ H01G 4/30 |
| | | 174/260 |

FOREIGN PATENT DOCUMENTS

| JP | 2004-266110 A | 9/2004 |
| JP | 2011-071220 A | 4/2011 |
| KR | 10-2012-0031235 A | 3/2012 |
| WO | 2011/002982 A2 | 1/2011 |

* cited by examiner

*Primary Examiner* — Dion R Ferguson
(74) *Attorney, Agent, or Firm* — McDermott Will & Emery LLP (57) ABSTRACT

A multilayer ceramic electronic component may include first and second metal frames connected to different external electrodes of a multilayer ceramic capacitor, respectively, and disposed to be spaced apart from a mounting surface of the multilayer ceramic capacitor; and an insulating layer disposed on a surface of the multilayer ceramic capacitor opposing the mounting surface thereof.

16 Claims, 10 Drawing Sheets

MULTILAYER CERAMIC ELECTRONIC COMPONENT AND BOARD HAVING THE SAME

CROSS-REFERENCE TO RELATED APPLICATION

This application claims benefit of priority to Korean Patent Application No. 10-2015-0074097 filed on May 27, 2015, with the Korean Intellectual Property Office, the disclosure of which is incorporated herein by reference.

TECHNICAL FIELD

The present disclosure relates to a multilayer ceramic electronic component and a board having the same.

BACKGROUND

A multilayer ceramic capacitor (MLCC), one type of multilayer electronic components, may be used in various electronic devices due to advantages such as compact size, high capacitance, and ease of mountability.

For example, a multilayer ceramic capacitor may be used as a chip type condenser mounted on boards of several electronic products such as display devices including liquid crystal displays (LCDs), plasma display panels (PDPs), and the like, computers, personal digital assistants (PDAs), mobile phones, and the like, and may serve to charge and discharge electricity.

Such a multilayer ceramic capacitor may have a structure in which a plurality of dielectric layers and internal electrodes disposed between the dielectric layers and having different polarities are alternately disposed.

In this case, since the dielectric layer has piezoelectricity, when a direct current (DC) or alternating current (AC) voltage is applied to the multilayer ceramic capacitor, a piezoelectric phenomenon may occur between the internal electrodes, thereby generating periodic vibrations while expanding and contracting a volume of a ceramic body depending on a frequency.

These vibrations may be transferred to a board through external electrodes of the multilayer ceramic capacitor and solders connecting the external electrodes with the board, and thus an entire board may become a sound reflecting surface to transmit the sound of vibrations as noise.

The sound of vibrations may correspond to an audio frequency range of 20 Hz to 20,000 Hz, potentially causing user discomfort. The vibration noise causing listener discomfort as described above is known as acoustic noise.

Further, in modern electronic devices, silence of mechanical components has been implemented, and thus the acoustic noise generated in the multilayer ceramic capacitor as described above may become more prominent.

In a case in which a device is operated in a silent environment, a user may consider the acoustic noise as a device flaw.

In addition, when audio output from a device having an audio circuit overlaps with the acoustic noise, the quality of the device may be deteriorated.

Meanwhile, as technology for decreasing the acoustic noise described above, a structure in which a metal frame is coupled to a multilayer ceramic capacitor has been disclosed.

However, during use of a mounter suction nozzle when a multilayer electronic component to which the metal frame is coupled is mounted on a board, sucked-up air is discharged to a nozzle vent while a front end of the mounter suction nozzle contacts the metal frame in such a manner that the multilayer electronic component may not be accurately adsorbed from a carrier tape, and thus mounting efficiency may be deteriorated.

SUMMARY

An aspect of the present disclosure may provide a multilayer ceramic electronic component capable of decreasing acoustic noise and preventing mounting efficiency from being deteriorated when the electronic component is mounted on a board, and a board having the same.

According to an aspect of the present disclosure, a multilayer ceramic electronic component may include: first and second metal frames connected to different external electrodes of a multilayer ceramic capacitor, respectively, and disposed to be spaced apart from a mounting surface of the multilayer ceramic capacitor; and an insulating layer disposed on a surface of the multilayer ceramic capacitor opposing the mounting surface thereof, and a board having the same.

The first and second metal frames may be connected to both end surfaces of the multilayer ceramic capacitor in a length direction, respectively.

The first and second metal frames may be connected to the surface of the multilayer ceramic capacitor opposing the mounting surface thereof, and disposed to be spaced apart from each other in a length direction.

The insulating layer may be disposed between the first and second metal frames, and the insulating layer and the first and second metal frames may form a flat surface.

The insulating layer may cover the surface of the multilayer ceramic capacitor opposing the mounting surface thereof and surfaces of the first and second metal frames opposing mounting surfaces of the first and second metal frames and have a flat surface.

According to another aspect of the present disclosure, a multilayer ceramic electronic component may include: a multilayer ceramic capacitor including a ceramic body including a plurality of dielectric layers and first and second internal electrodes alternately disposed with one of the dielectric layers interposed therebetween, and first and second external electrodes connected to portions of the first and second internal electrodes exposed to the outside of the ceramic body, respectively; first and second metal frames connected to the first and second external electrodes, respectively, and disposed to be spaced apart from a mounting surface of the multilayer ceramic capacitor; and an insulating layer disposed on a surface of the ceramic body opposing a mounting surface of the ceramic body.

According to another aspect of the present disclosure, a multilayer ceramic electronic component may include: a multilayer ceramic capacitor including first and second external electrodes and first and second surfaces opposing each other; first and second metal frames including first and second portions facing and spaced apart from the first surface of the multilayer ceramic capacitor, respectively, and third and fourth portions extending in first and second planes perpendicularly from ends of the first and second portions, respectively; and an insulating layer disposed on the second surface of the multilayer ceramic capacitor. The multilayer ceramic capacitor may be interposed between the third and fourth portions of the first and second metal frames. The multilayer ceramic electronic component may have a flat surface which is provided at least by the insulating layer and intersected by the first and second planes.

BRIEF DESCRIPTION OF DRAWINGS

The above and other aspects, features, and advantages of the present disclosure will be more clearly understood from the following detailed description taken in conjunction with the accompanying drawings, in which:

FIG. 10 is removed in;

DETAILED DESCRIPTION

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1:
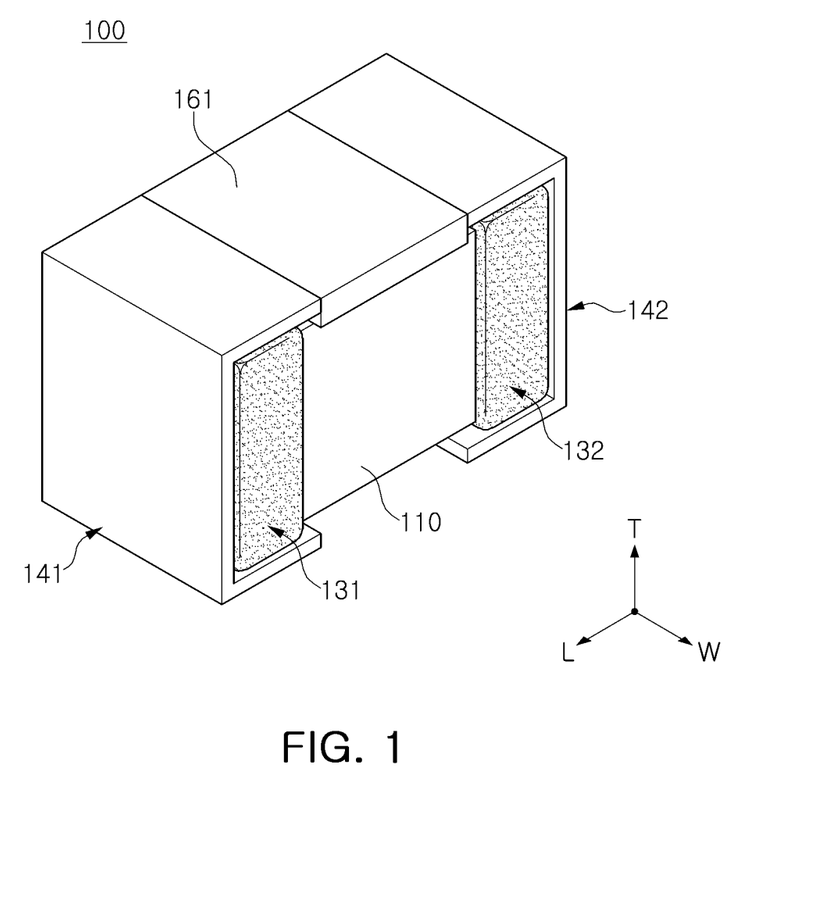
FIG. 1 is a perspective view schematically illustrating a multilayer ceramic electronic component according to an exemplary embodiment in the present disclosure.
Figure 2:
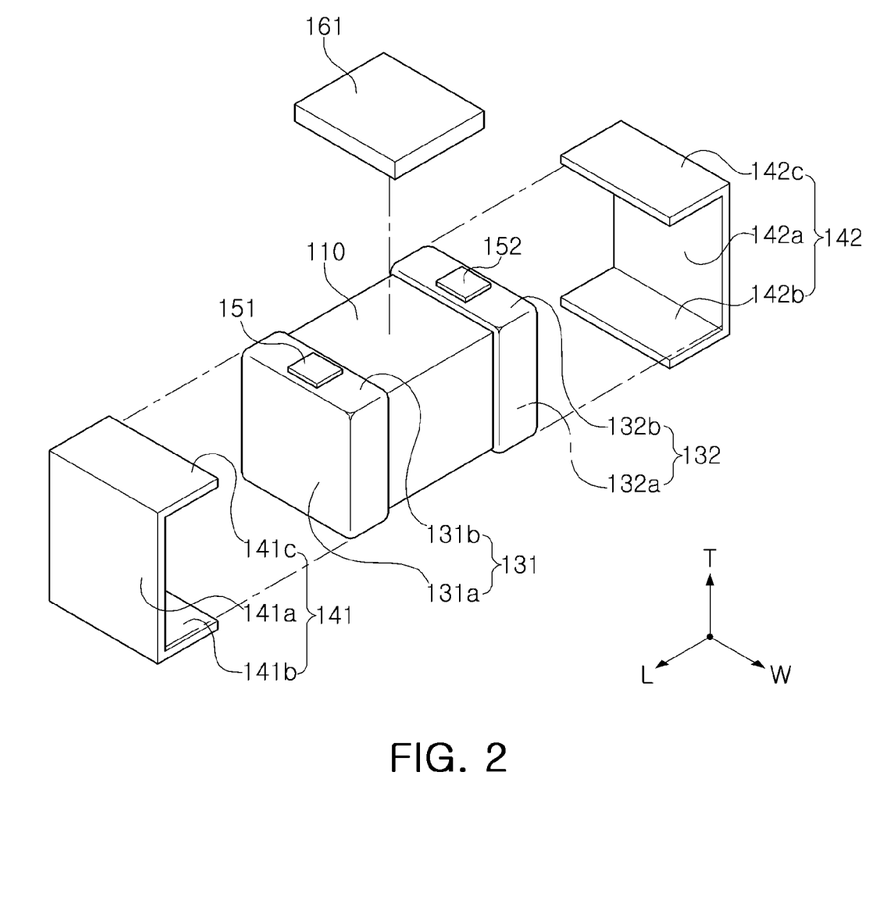
FIG. 2 is an exploded perspective view of the multilayer ceramic electronic component of FIG. 1.
Figures 3, 4:
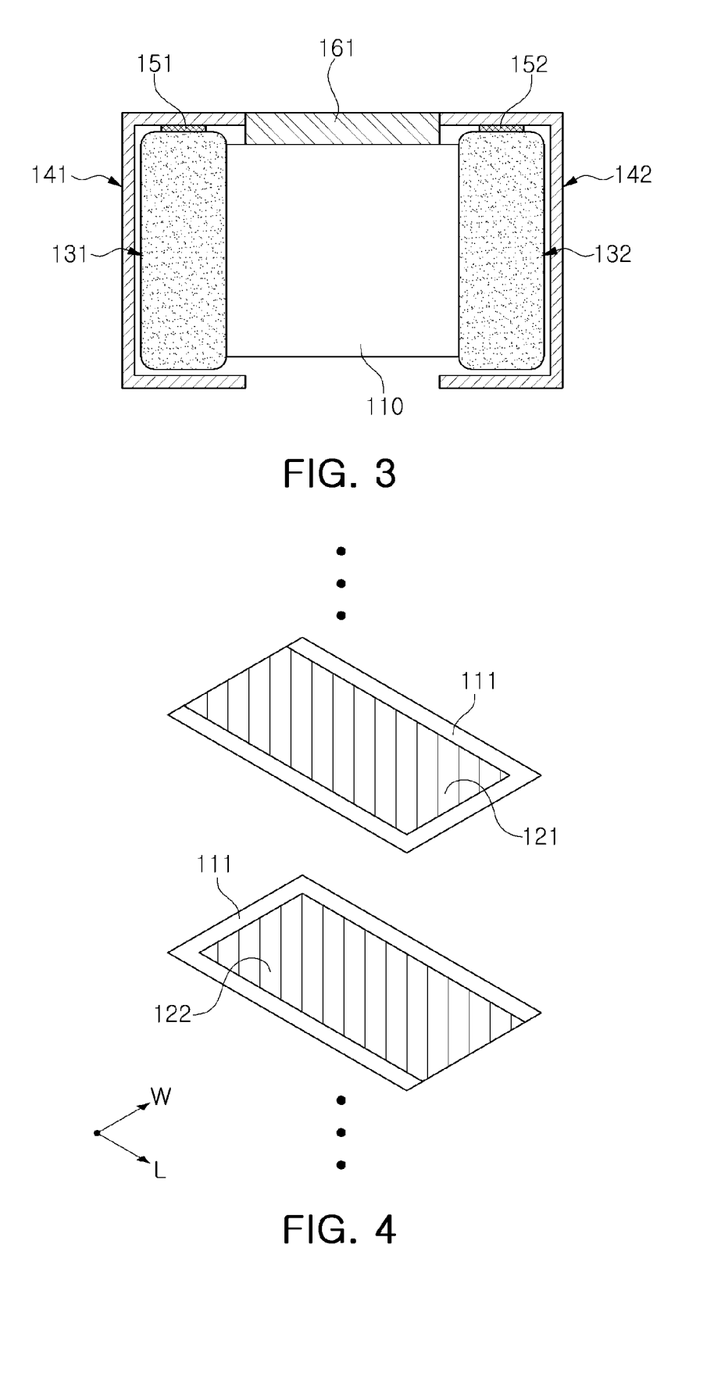
FIG. 3 is a side view of the multilayer ceramic electronic component of FIG. 1.
FIG. 4 is a separated view schematically illustrating an example of a structure in which internal electrodes are disposed in the multilayer ceramic electronic component according to the exemplary embodiment in the present disclosure.

FIG. 1 is a perspective view schematically illustrating a multilayer ceramic electronic component according to an exemplary embodiment, FIG. 2 is an exploded perspective view of the multilayer ceramic electronic component of FIG. 1, and FIG. 3 is a side view of the multilayer ceramic electronic component of FIG. 1.

Referring to FIGS. 1 through 3, a multilayer ceramic electronic component 100 according to the present exemplary embodiment may include a multilayer ceramic capacitor including a ceramic body 110 and first and second external electrodes 131 and 132, first and second metal frames 141 and 142, and an insulating layer 161.

According to the present exemplary embodiment, the ceramic body 110 may be formed by stacking a plurality of dielectric layers 111 in a thickness direction and then sintering the stacked dielectric layers 111.

In this case, the respective adjacent dielectric layers 111 of the ceramic body 110 may be integrated with each other so that boundaries therebetween are not readily apparent.

In addition, the ceramic body 110 may have a hexahedral shape. However, a shape of the ceramic body 110 is not limited thereto.

Directions of the ceramic body 110 will be defined in order to clearly describe the exemplary embodiment. L, W, and T illustrated in FIG. 1 refer to a length direction, a width direction, and a thickness direction, respectively. In this case, a downward direction refers to amounting direction, and an upward direction refers to a direction opposing the mounting direction.

Further, if necessary, cover layers having a predetermined thickness may be disposed on an uppermost internal electrode of the ceramic body 110 and below a lowermost internal electrode of the ceramic body 110.

In this case, the cover layers may be formed of the same composition as that of the dielectric layers 111, and formed by stacking at least one or more dielectric layers that do not include internal electrodes on upper and lower surfaces of the ceramic body 110.

In this case, a thickness of the dielectric layer 111 may be suitably changed depending on a capacitance design of the multilayer ceramic capacitor 100. In addition, the dielectric layer 111 may contain a ceramic material having high permittivity such as $BaTiO_3$-based ceramic powder, or the like. However, the material of the dielectric layer 111 is not limited thereto.

The $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, and the like, are partially solid-dissolved in $BaTiO_3$, or the like, but an example of the $BaTiO_3$-based ceramic powder is not limited thereto.

Meanwhile, a ceramic additive, an organic solvent, a plasticizer, a binder, a dispersant, and the like, may be further added to the dielectric layer 111 together with the ceramic powder.

As the ceramic additive, at least one of a transition metal oxide or carbide, rare earth elements, magnesium (Mg), and aluminum (Al) may be used.

As illustrated in FIG. 4, after first and second internal electrodes 121 and 122 are formed on ceramic sheets forming the dielectric layers 111 and stacked in the thickness direction, the first and second internal electrodes 121 and 122 may be alternately disposed in the ceramic body 110 with one of the dielectric layers 111 interposed therebetween by sintering.

The first and second internal electrodes 121 and 122 as described above, which are a pair of electrodes having different polarities from each other, may be disposed to face each other in a stacking direction of the dielectric layers 111, and may be electrically insulated from each other by the dielectric layer 111 disposed therebetween.

One ends of the first and second internal electrodes 121 and 122 may be exposed to both end surfaces of the ceramic body 110 in the length direction, respectively.

End portions of the first and second internal electrodes 121 and 122 alternately exposed to both end surfaces of the ceramic body 110 in the length direction may be electrically connected to the first and second external electrodes 131 and 132 on both end surfaces of the ceramic body 110 in length direction, respectively.

In this case, the first and second internal electrodes 121 and 122 may be formed of a conductive metal, such as nickel (Ni), a nickel (Ni) alloy, or the like. However, a material forming the first and second internal electrodes 121 and 122 is not limited thereto.

Through the above-mentioned configuration, when a predetermined voltage is applied to the first and second external electrodes 131 and 132, electric charges may be accumulated between the first and second internal electrodes 121 and 122 facing each other.

In this case, capacitance of the multilayer ceramic capacitor 100 may be in proportion to an overlapping area between the first and second internal electrodes 121 and 122 overlapping each other in the stacking direction of the dielectric layers 111.

Meanwhile, although a horizontally-stacked type multilayer ceramic electronic component in which the first and second internal electrodes 121 and 122 are stacked in the ceramic body 110 in the thickness direction parallel with a mounting surface is illustrated and described in the present exemplary embodiment, the stacking direction is not limited thereto.

Figure 5:
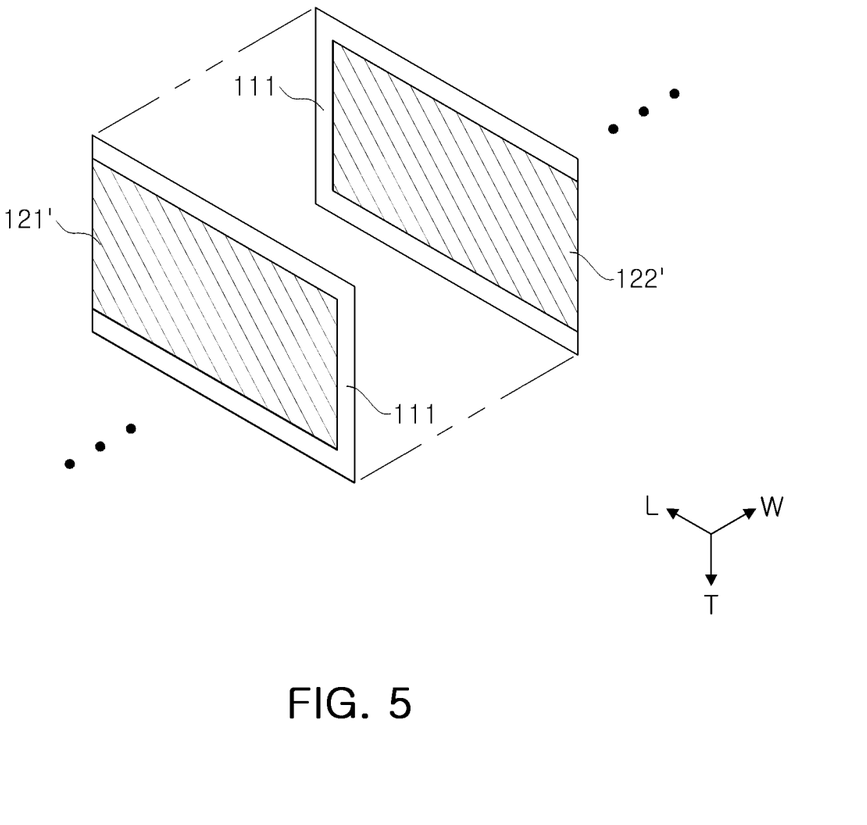
FIG. 5 is a separated view schematically illustrating another example of a structure in which internal electrodes are disposed in the multilayer ceramic electronic component according to the exemplary embodiment in the present disclosure.

For example, as illustrated in FIG. 5, the multilayer ceramic electronic component according to the present disclosure may be configured as a perpendicularly-stacked type multilayer ceramic electronic component in which the dielectric layers 111 and first and second internal electrodes 121' and 122' are stacked in the ceramic body 110 in the width direction perpendicular to a mounting surface of the multilayer ceramic electronic component.

The first and second external electrodes 131 and 132 may be formed by sintering a conductive paste for an external electrode containing copper (Cu) in order to provide high reliability such as excellent heat cycle resistance, moisture resistance, and the like, while having excellent electrical properties, but the material of the first and second external electrodes 131 and 132 is not limited thereto.

The first and second external electrodes 131 and 132 as described above may include first and second body portions 131a and 132a and first and second band portions 131b and 132b, respectively.

The first and second body portions 131a and 132a may be portions covering both end surfaces of the ceramic body 110 in the length direction, respectively, and electrically connected to the exposed end portions of the first and second internal electrodes 121 and 122, respectively.

The first and second band potions 131b and 132b may be portions extending from the first and second body portions 131a and 132a, respectively, to cover a portion of a surface of the ceramic body 110 opposing the mounting surface thereof.

In this case, if necessary, the first and second band portions 131b and 132b may extend to portions of the mounting surface of the ceramic body 110 and both side surfaces thereof in the width direction. In this case, adhesive strength of the first and second external electrodes 131 and 132, or the like, may be improved.

Meanwhile, plating layers (not illustrated) may be formed on the first and second external electrodes 131 and 132.

As an example, the plating layers may include first and second nickel (Ni) plating layers each formed on the first and second external electrodes 131 and 132 and first and second tin (Sn) plating layers each formed on the first and second nickel plating layers.

According to the present exemplary embodiment, the first and second metal frames 141 and 142 may have a substantially '⊏'-shape.

The first and second metal frames 141 and 142 may include first and second terminal portions 141b and 142b disposed below the first and second band portions 131b and 132b and serving as terminals when the multilayer ceramic electronic component is mounted on a board, first and second horizontal portions 141c and 142c disposed to face the first and second terminal portions 141b and 142b with the ceramic body 110 interposed therebetween in the thickness direction, and electrically connected to upper surfaces of the first and second band portions 131b and 132b, respectively, and first and second perpendicular portions 141a and 142a connecting the first and second horizontal portions 141c and 142c and the first and second terminal portions 141b and 142b, respectively. The first and second perpendicular portions 141a and 142a may extend in first and second planes perpendicularly from ends of the first and second terminal portions 141b and 142b, respectively.

In addition, if necessary, the first and second terminal portions 141b and 142b may be surface-treated by nickel/tin or nickel/gold plating, or the like, to have an excellent contact property with the solders when the multilayer ceramic electronic component is mounted on the board.

In this case, the first and second horizontal portions 141b and 142b may be disposed to be spaced apart from lower surfaces of the first and second band portions 131b and 132b, respectively.

In addition, the first and second perpendicular portions 141a and 142a may be disposed to be spaced apart from the first and second body portions 131a and 132a, respectively.

Therefore, since the first and second metal frames 141 and 142 may have a connection structure with the first and second external electrodes 131 and 132, in which only the first and second horizontal portions 141c and 142c and the upper surfaces of the first and second band portions 131b and 132b are adhered to each other, an area in which vibrations of the external electrodes are transferred may be decreased, and thus acoustic noise may be further decreased.

Further, the first and second metal frames 141 and 142 may absorb mechanical stress caused by deformation of the board in which the multilayer ceramic electronic component is mounted using elastic force, and may decrease mechanical stress transferred to the ceramic body 110 so that defects or damages such as cracks occurring in the ceramic body 110 may be prevented, and thus reliability may be improved.

A conventional multilayer ceramic electronic component includes an L-shaped metal frame. In such a structure, in order to fully absorb piezoelectric vibrations through elasticity of the metal frame, a multilayer ceramic capacitor is attached to a top of the metal frame to maintain as great a distance between the multilayer ceramic capacitor and a substrate as possible, thereby increasing a height of the multilayer ceramic electronic component. However, the metal frames of this exemplary embodiment in the present disclosure is formed to have the '⊏'-shape, and the upper surface of the multilayer ceramic capacitor may be attached to the upper horizontal portion of the metal frame. Thus, even in the case that the distance between the multilayer ceramic capacitor and the substrate is reduced, as compared with a conventional multilayer ceramic electronic component, sufficient length in the vertical portions connecting the lower horizontal portions of the metal frames to the upper horizontal portions thereof may be secured and an empty space between the lower surface of the multilayer ceramic capacitor and the lower horizontal portions of the metal frames may be provided to obtain an effect of a reduction in piezoelectric vibrations through the elasticity of the metal frames, thereby reducing a height of the multilayer ceramic electronic component.

Meanwhile, if necessary, plating layers (not illustrated) may be formed on the first and second metal frames 141 and 142.

As an example, the plating layers may include first and second nickel (Ni) plating layers each formed on the first and second metal frames 141 and 142, and first and second tin (Sn) plating layers each formed on the first and second nickel plating layers.

As another example, the plating layers may include first and second nickel (Ni) plating layers each formed on the first and second metal frames 141 and 142, and first and second gold (Au) plating layers each formed on the first and second nickel plating layers.

The insulating layer 161 may provide a surface of the multilayer ceramic electronic component opposing the mounting surface thereof as a flat surface. According to the present exemplary embodiment, the insulating layer 161 may be disposed on the upper surface of the ceramic body 110 between the first and second horizontal portions 141c and 142c so that upper surfaces of the first and second horizontal portions 141c and 142c and an upper surface of the insulating layer 161 form a flat surface.

The insulating layer 161 may be formed of a thermosetting resin such as an epoxy resin. However, the material of the insulating layer 161 is not limited thereto.

Meanwhile, first and second conductive adhesive layers 151 and 152 may be disposed between the upper surfaces of the first and second band portions 131b and 132b of the first and second external electrodes 131 and 132 and lower surfaces of the first and second horizontal portions 141c and 142c of the first and second metal frames 141 and 142.

The first and second conductive adhesive layers 151 and 152 may serve to improve adhesive strength between the first and second external electrodes 131 and 132 and the first and second metal frames 141 and 142 and be formed, for example, by applying a high-temperature solder or conductive paste and curing the applied high-temperature solder or conductive paste.

Figure 6:
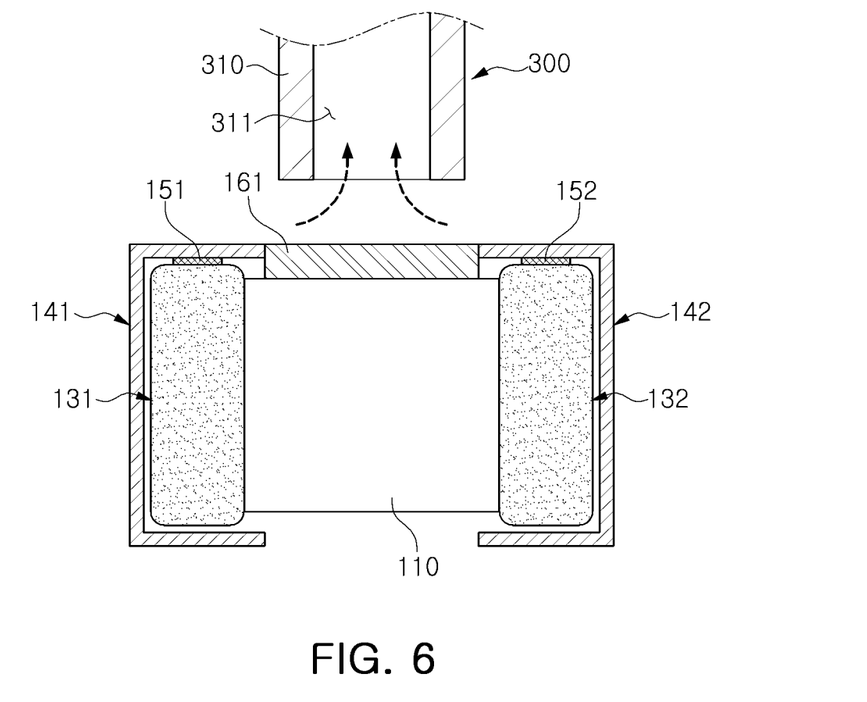
FIG. 6 is a side view illustrating an action when a mounter suction nozzle contacts the multilayer ceramic electronic component according to the exemplary embodiment in the present disclosure.

FIG. 6 is a side view illustrating an action when a mounter suction nozzle contacts the multilayer ceramic electronic component according to the exemplary embodiment.

According to the related art, during use of a mounter suction nozzle when a multilayer electronic component to which a metal frame is coupled is mounted on a board, sucked-up air is discharged to a nozzle vent while a front end of the mounter suction nozzle contacts the metal frame in such a manner that the multilayer electronic component may not be accurately adsorbed from a carrier tape, and thus mounting efficiency may be deteriorated.

Referring to FIG. 6, according to the present exemplary embodiment, since the upper surface of the multilayer ceramic electronic component contacted by a mounter suction nozzle 300 in order to mount the multilayer ceramic electronic component on a board may be formed as a flat surface due to the insulating layer 161, a possibility that suction pressure of the suction nozzle 300 will be decreased may be significantly reduced in such a manner that suction error as in the related art may be prevented, and thus mounting efficiency when the multilayer ceramic electronic component 100 is mounted on the board may be improved. Here, reference numeral 310 denotes a nozzle, and reference numeral 311 denotes a suction hole.

Figure 7:
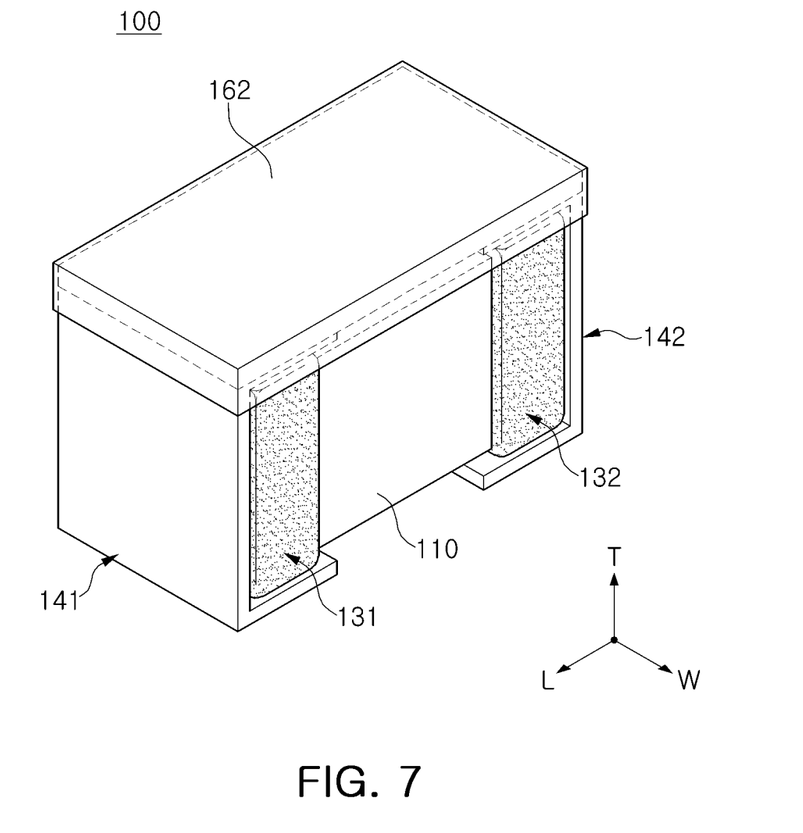
FIG. 7 is a perspective view illustrating a multilayer ceramic electronic component according to another exemplary embodiment in the present disclosure.

FIG. 7 is a perspective view illustrating a multilayer ceramic electronic component according to another exemplary embodiment.

Here, since structures of a multilayer ceramic capacitor and first and second metal frames 141 and 142 are similar to those in the exemplary embodiment described above, a detailed description thereof will be omitted, and an insulating layer 162 will mainly be described.

Referring to FIG. 7, in a multilayer ceramic electronic component 100 according to the present exemplary embodiment, lower surfaces of first and second horizontal portions 141c and 142c of the first and second metal frames 141 and 142 may be connected to upper surfaces of first and second band portions 131b and 132b of first and second external electrodes 131 and 132.

In addition, the insulating layer 162 may serve to cover a surface of the ceramic body 110 opposing a mounting surface thereof, upper end portions of the first and second horizontal potions 141c and 142c, and an entire upper surface of the ceramic body 110 opened between the first and second horizontal potions 141c and 142c to provide a surface (an upper surface) of the multilayer ceramic component opposing a mounting surface of the multilayer ceramic electronic component as a flat surface.

Figure 8:
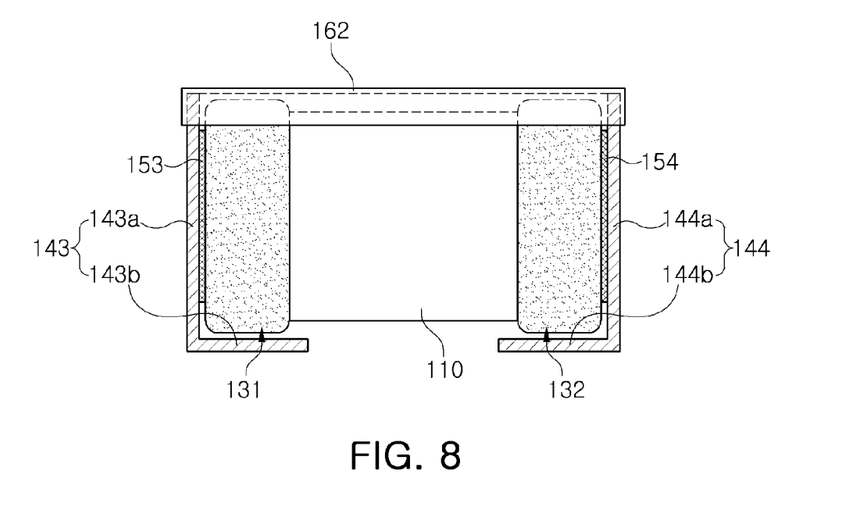
FIG. 8 is a side view illustrating a multilayer ceramic electronic component according to another exemplary embodiment in the present disclosure.
Figure 9:
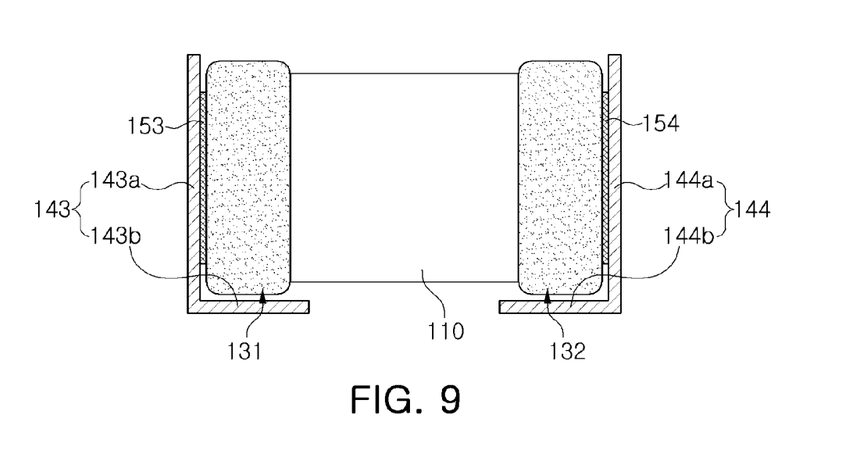
FIG. 9 is a side view illustrating a state in which an insulating layer in FIG. 8 is removed.

FIG. 8 is a side view illustrating a multilayer ceramic electronic component according to another exemplary embodiment, and FIG. 9 is a side view illustrating a state in which an insulating layer in FIG. 8 is removed.

Here, since structures of a ceramic body 110 and first and second external electrodes 131 and 132 are similar to those in the exemplary embodiment described above, a detailed description will be omitted, and only first and second metal frames 143 and 144 and an insulating layer 162 will mainly be described.

Referring to FIGS. 8 and 9, in the multilayer ceramic electronic component according to the present exemplary embodiment, the first and second metal frames 143 and 144 may include first and second terminal portions 143b and 144b disposed below the ceramic body 110, and first and second perpendicular portions 143a and 144a perpendicularly extending from end portions of the first and second terminal portions 143b and 144b.

The first and second terminal portions 143b and 144b may be disposed below first and second band portions 131b and 132b and serve as terminals when the multilayer ceramic electric component is mounted on a board.

The first and second perpendicular portions 143a and 144a may be connected to first and second body portions 131a and 132a, respectively, to serve to electrically connect the first and second metal frames 143 and 144 to the first and second external electrodes 131 and 132, respectively.

In this case, first and second conductive adhesive layers 153 and 154 may be disposed between the first and second body portions 131a and 132a and the first and second perpendicular portions 143a and 144a, respectively, to improve adhesive strength.

In addition, the insulating layer 162 may be disposed on a multilayer ceramic capacitor.

The insulating layer 162 may serve to cover upper end portions of the first and second perpendicular portions 143a and 144a and an entire upper surface of the ceramic body 110 to provide a surface (an upper surface) of the multilayer ceramic electronic component opposing a mounting surface thereof as a flat surface.

Figure 10:
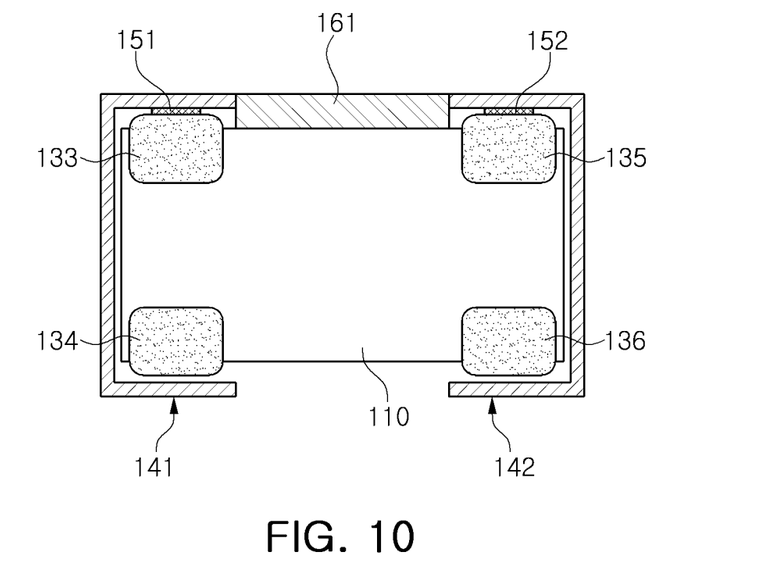
FIG. 10 is a side view illustrating a multilayer ceramic electronic component according to another exemplary embodiment in the present disclosure.
Figure 11:
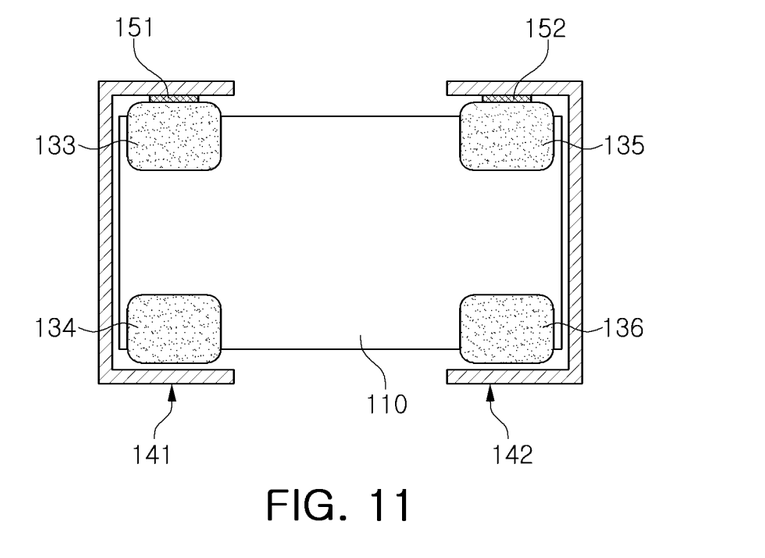
FIG. 11 is a side view illustrating a state in which an insulating layer
Figure 12:
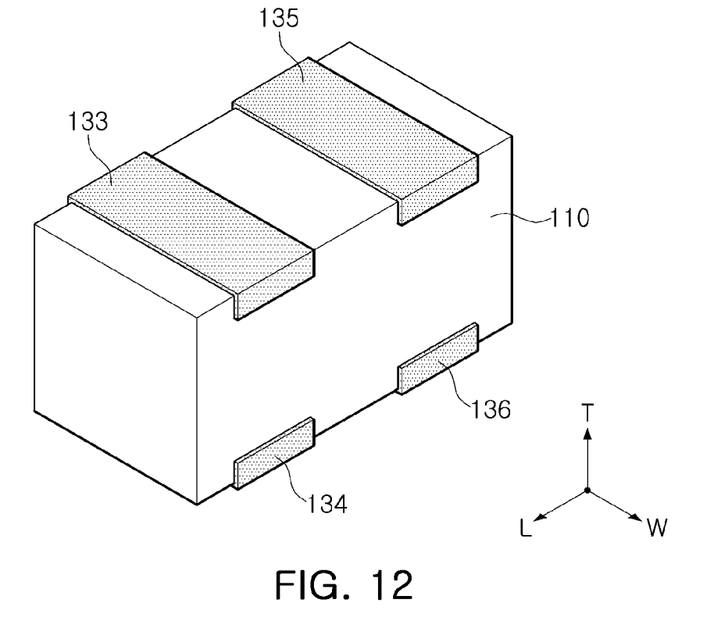
FIG. 12 is a perspective view of a multilayer ceramic capacitor used in the multilayer ceramic electronic component illustrated in FIG. 10.
Figure 13:
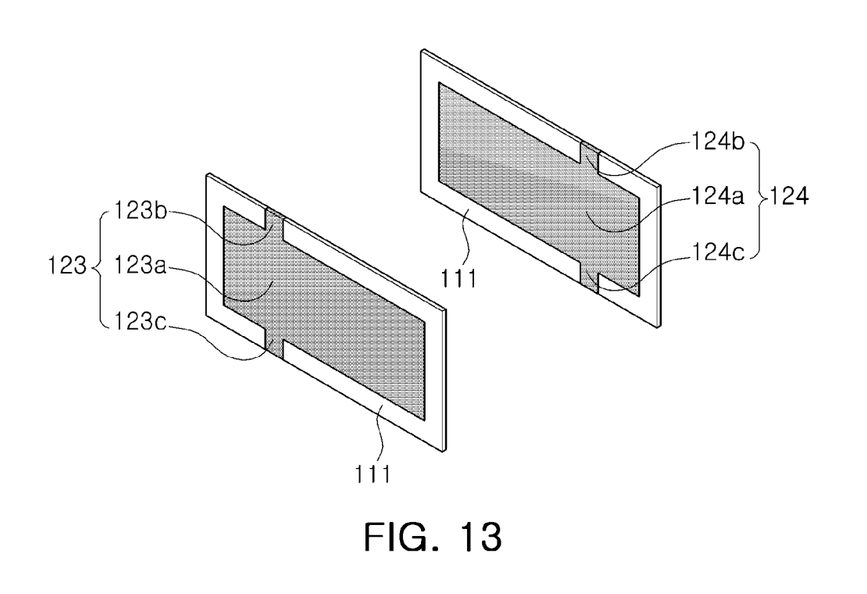
FIG. 13 is a separated view schematically illustrating an example of a structure in which internal electrodes of the multilayer ceramic capacitor used in the multilayer ceramic electronic component illustrated in FIG. 12 are disposed.

FIG. 10 is a side view illustrating a multilayer ceramic electronic component according to another exemplary embodiment, FIG. 11 is a side view illustrating a state in which an insulating layer in FIG. 10 is removed, FIG. 12 is a perspective view of a multilayer ceramic capacitor used in the multilayer ceramic electronic component illustrated in FIG. 10, and FIG. 13 is a separated view schematically illustrating an example of a structure in which internal electrodes of the multilayer ceramic capacitor used in the multilayer ceramic electronic component illustrated in FIG. 12 are disposed.

Here, since structures of first and second metal frames 141 and 142 are similar to those in the exemplary embodiment described above, a detailed description thereof will be omitted.

Referring to FIGS. 10 through 13, in the multilayer ceramic electronic component according to the present exemplary embodiment, first and second external electrodes 133 and 135 may be disposed on an upper surface of a ceramic body 110 to be spaced apart from each other in a length direction of the ceramic body 110.

In addition, a first internal electrode 123 may have a first lead portion 123b extending from a first capacitance portion 123a to be exposed to the upper surface of the ceramic body 110, and a second internal electrode 124 may have a second lead portion 124b extending from a second capacitance portion 124a overlapping the first capacitance portion 123a to be exposed to the upper surface of the ceramic body 110.

In this case, the first and second lead portions 123b and 124b may be disposed to be spaced apart from each other in the length direction of the ceramic body 110 and electrically connected to the first and second external electrodes 133 and 135, respectively.

Meanwhile, if necessary, third and fourth external electrodes 134 and 136 may be disposed on a lower surface of the ceramic body 110 to face the first and second external electrodes 133 and 135 in a thickness direction of the ceramic body 110, respectively.

In addition, the first internal electrode 123 may have a third lead portion 123c extending from the first capacitance portion 123a to be exposed to the lower surface of the ceramic body 110, and the second internal electrode 124 may have a fourth lead portion 124c extending from the second capacitance portion 124a overlapping the first capacitance portion 123a to be exposed to the lower surface of the ceramic body 110.

In this case, the third and fourth lead portions 123c and 124c may be disposed to be spaced apart from each other in the length direction of the ceramic body 110 and electrically connected to the third and fourth external electrodes 134 and 136, respectively.

The first to fourth external electrodes 133 to 136 may extend from the upper or lower surface of the ceramic body 110 to portions of both side surfaces of the ceramic body 110 in a width direction, respectively, in order to improve adhesive strength.

Further, in the first and second metal frames 141 and 142, first and second terminal portions 141b and 142b may be disposed to be spaced apart from the third and fourth external electrodes 134 and 136, and first and second horizontal portions 141c and 142c may be electrically connected to the first and second external electrodes 133 and 135, respectively.

In this case, first and second conductive adhesive layers 151 and 152 may be disposed between the first and second horizontal portions 141c and 142c and the first and second external electrodes 133 and 135, respectively, in order to improve adhesive strength.

In addition, an insulating layer 161 may be disposed on an upper surface of the multilayer ceramic capacitor.

The insulating layer 161 may be disposed on the upper surface of the ceramic body 110 between the first and second horizontal portions 141c and 142c of the first and second metal frames 141 and 142, and thus upper surfaces of the first and second horizontal portions 141c and 142c and an upper surface of the insulating layer 161 may form a flat surface.

Figure 14:
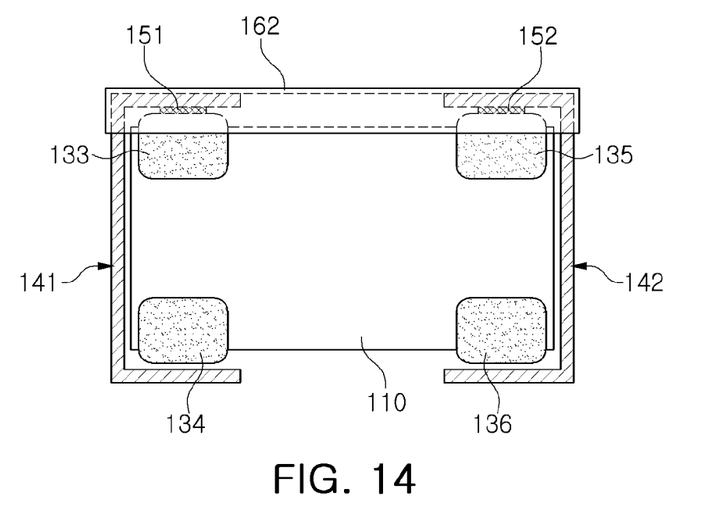
FIG. 14 is a side view illustrating another example of an insulating layer in the multilayer ceramic electronic component of FIG. 10.

Meanwhile, as another example, an insulating layer 162 may cover the upper surface of the ceramic body 110 and the first and second horizontal portions 141c and 142c as illustrated in FIG. 14 to thereby form a flat surface.

Figure 15:
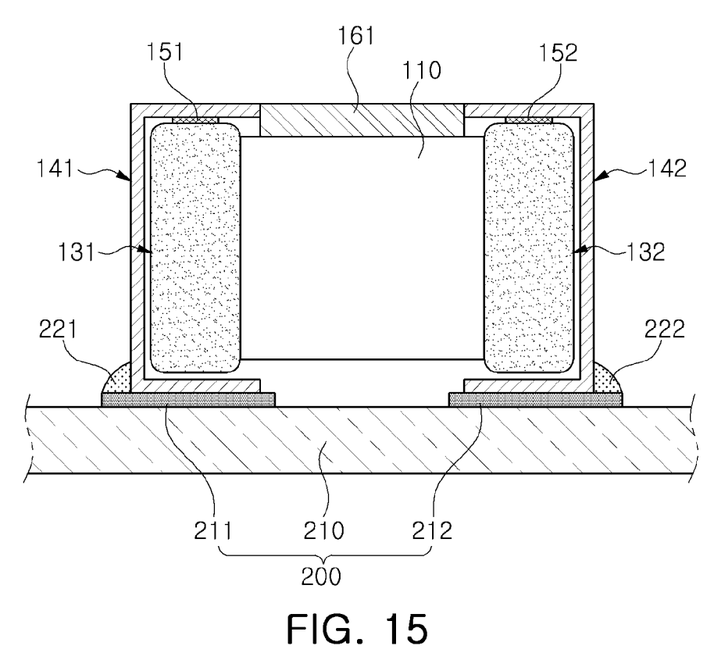
FIG. 15 is a side view illustrating a board in which a multilayer ceramic electronic component according to the exemplary embodiment in the present disclosure is mounted on a circuit board.

FIG. 15 is a side view schematically illustrating a board in which a multilayer ceramic electronic component according to the exemplary embodiment is mounted on a circuit board.

Referring to FIG. 15, a board 200 having the multilayer ceramic electronic component 100 according to the present exemplary embodiment may include a circuit board 210 on which the multilayer ceramic electronic component 100 is mounted and first and second electrode pads 211 and 212 formed on an upper surface of the circuit board 210 to be spaced apart from each other in the length direction.

In this case, the multilayer ceramic electronic component 100 may be electrically connected to the circuit board 210 by solders 221 and 222 in a state in which the first and second terminal portions 141b and 142b of the first and second metal frames 141 and 142 disposed on the lower surface of the ceramic body 110 are positioned to contact the first and second electrode pads 211 and 212 of the circuit board 210, respectively.

When voltages having different polarities are applied to the first and second external electrodes 131 and 132 of the multilayer ceramic capacitor through the first and second metal frames 141 and 142 in a state in which the multilayer ceramic electronic component 100 is mounted on the circuit board 210 as described above, the ceramic body 110 may be expanded and contracted in the thickness direction due to an inverse piezoelectric effect of the dielectric layers 111, and both end portions of the first and second external electrodes 131 and 132 may be contracted and expanded as opposed to expansion and contraction of the ceramic body 110 in the thickness direction due to a Poisson effect.

The expansion and contraction of the ceramic body 110 as described above may generate vibrations, and these vibrations are transferred to the circuit board 210 through the external electrodes, and thus sound is reflected from the circuit board 210, thereby generating acoustic noise.

According to the present exemplary embodiment, piezoelectric vibrations transferred to the circuit board through the first and second external electrodes 131 and 132 of the multilayer ceramic capacitor may be absorbed by the first and second metal frames 141 and 142 using elasticity, and mechanical stress generated due to warparge of the circuit board 210, or the like, may also be absorbed by the first and second metal frames 141 and 142, and thus acoustic noise of a product may be decreased.

As set forth above, according to exemplary embodiments, vibrations transferred through the external electrodes of the ceramic body may be absorbed by elastic force of the metal frames, and thus acoustic noise may be decreased.

Further, the surface of the multilayer ceramic electronic component opposing the mounting surface thereof may be planarized by the insulating layer, and thus the suction error of the mounter suction nozzle may be decreased, thereby preventing mounting efficiency from being deteriorated when the multilayer ceramic electronic component is mounted on the board.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
   first and second metal frames connected to different external electrodes of a multilayer ceramic capacitor, respectively, and disposed to be spaced apart from a mounting surface of the multilayer ceramic capacitor, wherein first and second portions of the first and second metal frames, respectively, are disposed on a top surface of the multilayer ceramic capacitor opposing the mounting surface; and
   an insulating layer disposed on the top surface, except portions of the top surface where the first and second portions of the first and second metal frames are disposed,
   wherein the insulating layer and the first and second portions of the first and second metal frames form a flat surface.

2. The multilayer ceramic electronic component of claim 1, wherein the first and second metal frames are connected to both end surfaces of the multilayer ceramic capacitor in a length direction, respectively.

3. The multilayer ceramic electronic component of claim 1, wherein the first and second portions of the first and second metal frames are disposed to be spaced apart from each other in a length direction.

4. The multilayer ceramic electronic component of claim 3, wherein the insulating layer is disposed between the first and second metal frames.

5. A multilayer ceramic electronic component comprising:
   a multilayer ceramic capacitor including a ceramic body including a plurality of dielectric layers and first and second internal electrodes alternately disposed with one of the dielectric layers interposed therebetween, and first and second external electrodes connected to portions of the first and second internal electrodes exposed to the outside of the ceramic body, respectively;
   first and second metal frames connected to the first and second external electrodes, respectively, disposed to be spaced apart from a mounting surface of the multilayer ceramic capacitor, including first and second horizontal portions disposed on first and second portions of a top surface of the ceramic body opposing the mounting surface thereof, respectively; and
   an insulating layer disposed on the top surface, except the portions of the top surface where the first and second horizontal portions are disposed,
   wherein the first and second horizontal portions and the insulating layer form a flat surface.

6. The multilayer ceramic electronic component of claim 5, wherein the first and second metal frames include:
   first and second terminal portions, respectively, disposed to face the mounting surface of the ceramic body; and
   first and second perpendicular portions perpendicularly extending from end portions of the first and second terminal portions, respectively, and connected to the first and second external electrodes, respectively.

7. The multilayer ceramic electronic component of claim 5, wherein the first and second external electrodes include:
   first and second body portions provided on both end surfaces of the ceramic body in a length direction, respectively; and
   first and second band portions extending from the first and second body portions to portions of the top surface of the ceramic body.

8. The multilayer ceramic electronic component of claim 7, wherein the first and second metal frames include:
   first and second terminal portions, respectively, disposed to face the mounting surface of the ceramic body;
   the first and second horizontal portions, which are disposed to face the first and second terminal portions with the ceramic body interposed therebetween, and are connected to the first and second band portions, respectively; and
   first and second perpendicular portions connecting the first and second terminal portions and the first and second horizontal portions to each other, respectively.

9. The multilayer ceramic electronic component of claim 8, wherein the first and second perpendicular portions are disposed to be spaced apart from the first and second body portions of the first and second external electrodes.

10. The multilayer ceramic electronic component of claim 8, wherein the insulating layer is disposed between the first and second horizontal portions.

11. The multilayer ceramic electronic component of claim 5, wherein the first internal electrode has a first lead portion exposed to the surface of the ceramic body opposing the mounting surface thereof,
   the second internal electrode has a second lead portion exposed to the surface of the ceramic body opposing the mounting surface thereof and disposed to be spaced apart from the first lead portion, and
   the first and second external electrodes are provided on the surface of the ceramic body opposing the mounting surface thereof to be connected to the first and second lead portions, respectively.

12. The multilayer ceramic electronic component of claim 11, wherein the first and second internal electrodes further include third and fourth lead portions exposed to the mounting surface of the ceramic body, and
   the multilayer ceramic capacitor further includes third and fourth external electrodes disposed on the mounting surface of the ceramic body to be connected to the third and fourth lead portions, respectively.

13. The multilayer ceramic electronic component of claim 5, wherein the dielectric layers are stacked horizontally to the mounting surface of the multilayer ceramic capacitor.

14. The multilayer ceramic electronic component of claim 5, wherein the dielectric layers are stacked perpendicularly to the mounting surface of the multilayer ceramic capacitor.

15. A multilayer ceramic electronic component comprising:
- a multilayer ceramic capacitor including first and second external electrodes and first and second surfaces opposing each other;
- first and second metal frames including first and second portions facing and spaced apart from the first surface of the multilayer ceramic capacitor, respectively, third and fourth portions extending in first and second planes perpendicularly from ends of the first and second portions, respectively, and fifth and sixth portions respectively disposed on first and second portions of the second surface; and
- an insulating layer disposed on the second surface of the multilayer ceramic capacitor, except the portions of the top surface where the fifth and sixth portions are disposed,
- wherein the multilayer ceramic capacitor is interposed between the third and fourth portions of the first and second metal frames, and
- the multilayer ceramic electronic component has a flat surface which is provided at least by the insulating layer and the fifth and sixth portions, and intersected by the first and second planes.

16. The multilayer ceramic electronic component of claim 15, wherein the fifth and sixth portions extend perpendicularly from ends of the third and fourth portions, respectively,
- the third and fourth portions of the first and second metal frames are spaced apart from the multilayer ceramic capacitor, and
- the fifth and sixth portions of the first and second metal frames are respectively connected to the first and second external electrodes of the multilayer ceramic capacitor through first and second conductive adhesive layers disposed therebetween.

* * * * *